Jan. 6, 1970        N. G. PATEL        3,488,053
AMUSEMENT AND DEXTERITY TEST APPARATUS
Filed June 30, 1967
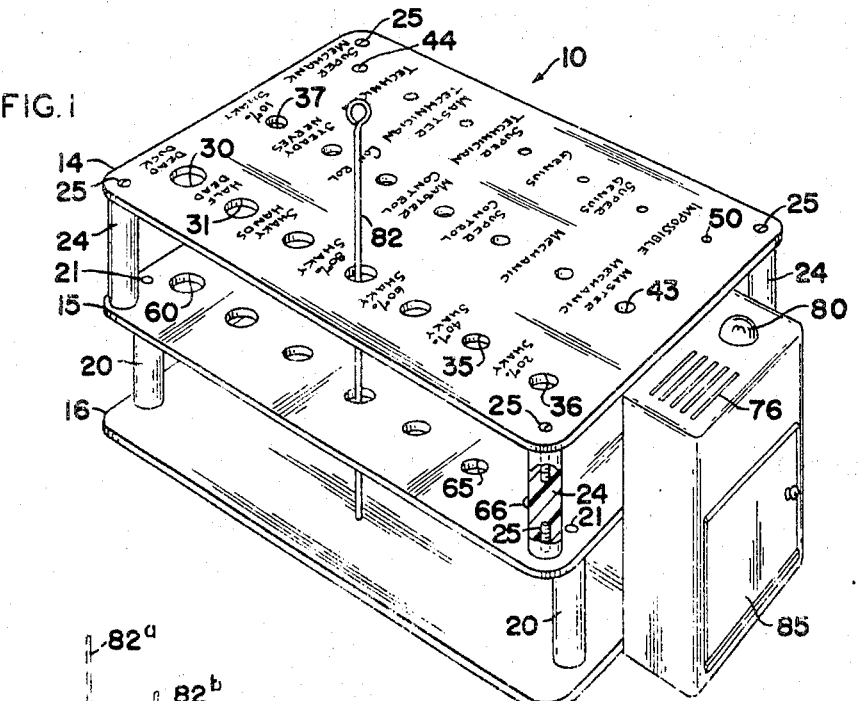
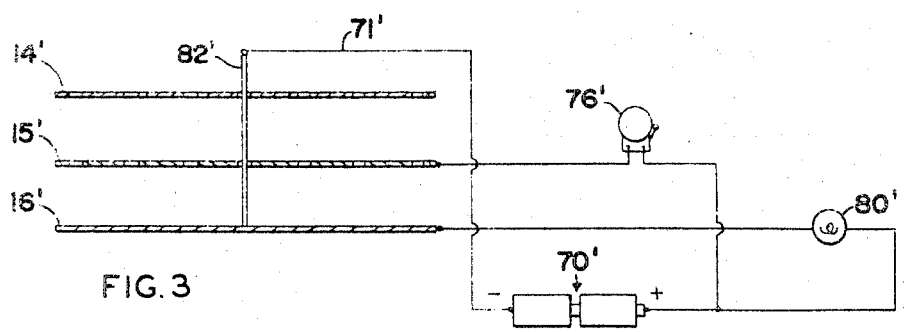
INVENTOR.
NARAYAN G. PATEL
BY Watts, Hoffmann,
Fisher & Heinke
ATTORNEYS.

United States Patent Office 3,488,053
Patented Jan. 6, 1970

3,488,053
AMUSEMENT AND DEXTERITY TEST APPARATUS
Narayan G. Patel, 4810 Hartley Drive, Lyndhurst, Ohio 44124
Filed June 30, 1967, Ser. No. 650,492
Int. Cl. A63f 9/06
U.S. Cl. 273—1            16 Claims

ABSTRACT OF THE DISCLOSURE

The apparatus of this invention is constructed of one or more electrically conducting members, some having holes therethrough. The members are connected to an indicator for visually and/or audibly indicating when a probe inserted through certain of the holes comes into contact with certain of the plates.

BACKGROUND OF THE INVENTION

Field of the invention

The present invention relates to game apparatus and more particularly to a game which is suitable for use in measuring normal dexterity, coordination and control as well as for amusement purposes.

Description of the prior art

Certain proposals in the prior art are directed to apparatus having a plurality of electrically conducting plates, some of which have holes in them, for receiving a member to bring about electrical contact between the plates. One such proposal comprises top and bottom apertured plates having aligned holes. A contact plate having aligned holes would be situated between the top and bottom apertured plates in circuit with a source of electricity. Another contact plate having aligned holes would be situated beneath the bottom plate in circuit with an electric bulb. A probe or stylus may be passed through the aligned holes so that electrical contact is established between the contact plates to light a light.

Another proposed game apparatus is comprised of three layers, the top two layers each having a plurality of aligned holes arranged in them. In one variation of the game, a spring-biased contact on a sensing probe is to be inserted through the holes, depression of the contact indicating which ones of the holes are obstructed by an additional plate or member inserted between the top two layers.

These and other similar known games are directed primarily to either chance selection or certain holes or to mental skills in selecting a particular hole. It is apparent that no physical skill other than the ability to insert a member into a hole is required. That is, there is no particular manual ability required for the manner in which the member is inserted through the holes.

SUMMARY OF THE INVENTION

A preferred form of the present invention is constructed of three electrically conducting plates arranged parallel to one another. The upper two plates have a plurality of spaced, aligned holes arranged in rows, the holes arranged in order according to the magnitude of their diameters. The top plate is connected to one side of a power supply, the middle plate is connected to the other side of the power supply via a buzzer, and the bottom plate is connected to the same other side of the power supply via a lamp. An electrically conducting probe having a diameter somewhat less than the diameter of the larger holes may be inserted through aligned holes in the top plate and the middle plate to contact the bottom plate. If only the top plate and the bottom plate are contacted, an electrical circuit is created thereby energizing the lamp. If the rod touches the top plate, the middle plate, and the bottom plate, the buzzer is additionally energized.

In an alternative form of the invention, the probe is connected to one side of the power supply instead of the top plate.

The objective of the game played with, or physical test conducted with, the apparatus is to energize the lamp without energizing the buzzer. This is accomplished by passing the rod through the top and the middle plates but contacting only the top plate and the bottom plate. In other words, touching the middle plate should be avoided.

Since the holes are arranged in graduated order according to the magnitude of their diameters, superior manual control and dexterity will help a person using the game to reach smaller holes without energizing the buzzer. Such an apparatus can be used as a toy for a child who has learned to hold things and move them in a desired direction, but may be used by persons of almost all ages. In addition to being used merely for enjoyment, the apparatus could be used, for example, to train nervous patients, to check and improve the neuromuscular coordination of persons subject to physical fatigue or stress, or to check physiological ailments or loss of manual control due to intoxication or other conditions affecting coordination of vision and/or muscular control.

Accordingly, an object of the present invention is to provide a novel and improved apparatus for testing of and amusement of persons in a wide range of ages.

Additional objects of the present invention will be apparent and a better understanding of the present invention may be had with reference to the following detailed description of the accompanying drawings.

DESCRIPTION OF THE DRAWINGS

FIGURE 1 is a perspective view of a game apparatus of the present invention;

FIGURE 2 is a schematic diagram of the circuit arrangement of the present invention; and FIGURE 3 is an alternative circuit arrangement of the present invention.

DESCRIPTION OF THE PREFERRED EMBODIMENTS

A preferred form of the present invention comprises a game apparatus designated generally by the numeral 10. The game apparatus 10 preferably includes three rectangular plates, a top plate 14, a middle plate 15, and a bottom plate 16, arranged parallel and near one another. The middle plate 15 is superposed above the bottom plate 16 and supported by means of insulating supports 20 arranged near four corners of the middle plate 15 and the bottom plate 16. The insulating supports 20 are preferably composed of an insulating material such as plastic and are secured to the middle plate 15 and the bottom plate 16 by screws 21. The top plate 14 is superposed above the middle plate 15 and supported by means of insulating supports 24 arranged near each of the four corners of the top plate 14 and the middle plate 15.

The insulating supports 24 are secured to the top plate 14 and the bottom plate 15 by means of screws 25. The respective locations of the screws 21, 25 at the individual corners of the middle plate 15 should be spaced a short distance from one another for access purposes. The top plate 14, the middle plate 15 and the bottom plate 16 should be composed of an electrically conductive material, such as aluminum, and may be spaced a certain distance apart, for example, two inches has been found convenient.

The top plate 14 defines a plurality of holes 30–50 arranged in three parallel rows with seven holes in each row. Holes 30–36 are arranged in one row, holes 37–43 are arranged in a second row parallel to the first row, and holes 44–50 are arranged in the third row parallel to the first and second rows. Beginning with hole 30 and ending with hole 50, the holes are arranged in descending order according to the magnitude of their diameters, which on the other hand is the ascending order of difficulty. The incremental difference or gradation between diameters of adjacent holes taken in order of size is preferably equal. The range of magnitudes of the diameters of the holes 30–50 is a matter of choice and may, for example, be ⅜ inch for the hole 30 with incremental differences in magnitude of the remaining holes being equal down to a diameter of 1/16 inch for the hole 50.

The middle plate 15 defines 21 holes, each of which is aligned with a corresponding hole in the top plate 14. The holes in the middle plate 15 are preferably of the same magnitude as the corresponding aligned holes in the top plate 14 but may be slightly larger or smaller than the corresponding holes in the top plate 14 if desired. In the embodiment shown in FIGURE 1, using holes 60–66 as an example, the holes 60–66 are axially aligned with corresponding holes 30–36, respectively, in the top plate 14 and the holes 60–66 have diameters equal to the diameters of the respective holes 30–36.

The circuit arrangement of the preferred form of the invention is shown schematically in FIGURE 2. As shown, the top plate 14 is connected to a negative terminal 69 of a power supply 70 via a conductor 71. The middle plate is connected via a conductor 74 to an audible indicating means, such as a buzzer 76. The buzzer 76 is connected via a conductor 77 to a positive terminal 78 of the power supply 70. The bottom plate 16 is connected via a conductor 79 to a visual indicating means such as a small incandescent lamp 80. The lamp 80 is connected via a conductor 81 to the positive terminal 78 of the power supply 70. A suitable power supply would be two D-type dry cell batteries placed in series. The power supply 70, the buzzer 76, and the lamp 80 may all be mounted in a suitable housing 85 connected near the plates 14–16.

As shown in FIGURE 2, an elongated contact probe in the form of a rod 82 is inserted through a hole in the top plate 14 and through a corresponding aligned hole in the middle plate 15, contact being made with the top plate 14 and the bottom plate 16. The contact rod 82 may, for example, have a diameter substantially smaller than the largest hole but about equal to that of the smallest hole, and in the form shown is 1/16 inch. It can therefore be seen that a relatively larger degree of lateral movement of the contact rod 82 is permitted in the larger than in the smaller holes. The contact rods 82a, b, shown in dotted lines in other holes, indicate progressive insertion into the holes, the boundaries of the various holes established by the plate 14, 15 which limit lateral movement of the rods.

If contact is merely made with the top plate 14, as indicated by the contact rod 82a, there will be no indication signal from either the buzzer 76 or the lamp 80. However, of there is contact with both the top plate 14 and the middle plate 15, as indicated by the contact rod 82b, the buzzer 76 will be energized producing an audible signal. Furthermore, if the contact rod 82 is fully inserted to make contact with the bottom plate 16, the lamp 80 will be energized if there is also contact with the top plate 14. But if contact is simultaneously made with the middle plate 15, the buzzer 76 will also sound. With the particular form of the invention shown, the object is to energize the lamp 80 without energizing the buzzer 76.

An alternative form of the invention is shown in FIGURE 3. This form is the same as that shown in FIGURE 2, except that the conductor 71′ connected to one side of the power supply 70′ is connected to the contact probe 52′ rather than to the top plate 14′. The buzzer 76′ and the middle plate 15′, along with the lamp 80′ and the middle plate 15′ are connected to the other side of the power supply 70′. With this form, if contact rod 52′ makes any contact at all with the middle plate 15′, regardless of whether there is also contact with the top plate 14′, the buzzer 76 will sound. The object is to contact the bottom plate 16′ to energize the lamp 80′ without contacting the middle plate 15′ to energize the buzzer 76′, but regardless of whether there is also contact with the plate 14′. Also, the top plate 14 could be eleminated in such an apparatus. Although this alternative form has been recited, it is contemplated that there are numerous other variations of the present form of the invention.

OBJECTIVE OF THE PRESENT FORM

The primary objective of the game to be played with the apparatus shown is to energize the lamp 80 without energizing the buzzer 76. This is accomplished by contacting the top plate 14 and the bottom plate 16 with the contact rod 52 without contacting the middle plate 15. The contact rod 82 shown is straight, however, the game may be made more difficult by using a crooked rod. In the apparatus shown, the contact rod 82 is 1/16 inch in diameter, which is the size of the hole 50. Thus, it is just about impossible to insert the contact rod 52 through the hole 50 and its corresponding aligned hole without energizing the buzzer 76.

Game 1

Each player shall take three turns and try to "beat the buzzer" going progressively through more difficult steps by passing the rod first through the corresponding larger size holes and progressively through the corresponding smaller size holes. The player will receive the title associated with the highest order hole depending on the smallest hole he has arrived at and "beat the buzzer" in his three turns. To stimulate the imagination and enjoyment of the players, various titles may be associated with each hole, and therefore, certain indicia are associated with each of the holes 30–50. As shown in FIGURE 1 and in ascending order of difficulty are:

(1) dead duck
(2) half-dead
(3) shaky hands
(4) 80% shaky
(5) 60% shaky
(6) 40% shaky
(7) 20% shaky
(8) 10% shaky
(9) steady nerves
(10) control
(11) master control
(12) super control
(13) mechanic
(14) master mechanic
(15) super mechanic
(16) technician
(17) master technician
(18) super technician
(19) genius
(20) super genius
(21) impossible Game 2

Instead of assigning titles to the positions of the holes, a numerical value may be associated with each hole. For example, 5 may be assigned to the hole 30, 10 may be assigned to the hole 31 and so on in increments of 5. Each player may then take a turn to pass the contact rod 52 through the smallest possible hole he can without energizing the buzzer 76 and will receive that score associated with the smallest hole through which he has inserted the contact rod 52 and activated the lamp 80 without energizing the buzzer 76. When a player activates the buzzer 76, he losses his turn, and the next player takes over. After a predetermined number of rounds, the score is added up and the player with the highest score wins the game.

Game 3

Using numerical indicia as in Game 2, each player may be provided with, for example, 50 poker chips. Each chip may be assigned to a value according to color, for example red—30, Blue—20, and white—10. The order of play is determined by each player taking an initial turn and trying to obtain as high a score as possible in that one turn. The player with the highest score in the initial round will start the game first with the other players taking respective turns in the order of their scores. In case of a tie, in the initial round, the two players having the same score will repeat their initial turn until one obtains a higher score than the other. After players have agreed on their sequence of play, the first player proceeds. For each hole that the player energizes the light 80 without energizing the buzzer 76, he will collect the number of chips assigned to that hole from each player. Once he energizes the buzzer 76, he losses his turn and the next player proceeds. A player who losses all his chips is out of the game, and the last player to remain in the game is the winner. The duration of play may be made longer or shorter depending on the values assigned to the holes and the values assigned to the chips.

Game 4

This game may be thought of more as for enjoyment rather than competitive skill and may be termed "How Much Do You Drink?" The game will provide amusement at parties and may provide enjoyment to drinkers of alcoholic beverages and non-drinkers alike. Before the game starts, the players may be told that the game will determine where they stand as far as their drinking personality is concerned. The categories may be arranged with the associated holes in ascending order of difficulty as follows:

(1) Brother, you are dead.
(2) You are on the way.
(3) Now skull is busted, you are smashed up.
(4) You have broken legs and hands.
(5) You are involved in an accident.
(6) Do not drive.
(7) Lost control.
(8) Friends stare at you.
(9) You feel drunk.
(10) You took one to many.
(11) Now you have just enough.
(12) Happy in the party.
(13) An occasional drinker.
(14) You drink once a week.
(15) You drink once a month.
(16) Want to be just social.
(17) It smells good.
(18) You haven't opened it yet.
(19) You just saw the bottle.
(20) Never saw the drink.
(21) Never heard of alcohol.

It can be seen from the foregoing detailed description that the disclosed apparatus of the present invention may be used for amusement as well as therapeutic purposes. As the user proceeds to progressively more difficult positions, a correspondingly greater degree of manual dexterity is required. Appropriate indicia on the apparatus provide the user with a measure of his manual dexterity and indicating means on the apparatus indicates a particular degree of dexterity attained.

Although the invention has been described in its preferred form with a certain degree of particularity, it is understood that the present disclosure of the preferred form has been made only by way of example and that numerous changes in the details of construction and the combination and arrangement of parts and variations of uses, may be restored to without departing from the spirit and the scope of the invention as hereinafter claimed.

What is claimed is:

1. An amusement and manual dexterity testing apparatus comprising:
   (a) a pair of apertured electrically-conductive plate members;
   (b) a third electrically-conductive plate member;
   (c) an electrically-conductive probe member of a diameter small enough to pass through each plate member aperture;
   (d) insulating means maintaining the plate members in spaced relationship with the corresponding apertures of the first and second plate members axially aligned and with the spaces between the plate members being sufficiently unobstructed that upon insertion of the problem member through an aperture in the first plate member it can thereupon pass through an aperture of the second plate member and thence engage the third plate member without interference by other structure;
   (e) a source of electric potential;
   (f) conductors connecting one of the members to a first side of the source of potential;
   (g) a first signal-producing element;
   (h) further conductors connecting another of the members in series with the first signal-producing element and to the other side of said source of potential;
   (i) a second signal-producing element; and
   (j) further conductors connecting still another of said members in series with said second signal-producing element and to the other side of said source of potential.

2. The device of claim 1 wherein said one member is the probe member.

3. The device of claim 1 wherein said one member is said first apertured plate member.

4. The device of claim 1 wherein the holes in the first and second plate members are of varying sizes and wherein each hole in the first plate is axially aligned with a hole of identical size in the second plate member.

5. The device of claim 4 wherein the holes are arranged sequentially so that each hole in the first plate is slightly larger than the preceding hole in that plate.

6. Apparatus comprising:
   (a) first and second aperture plate means defining holes arranged in a plane, the holes arranged in order according to graduations in size, said plate means being electrically conductive around each hole;
   (b) a conductive base;
   (c) first and second indicating means;
   (d) a probe insertable through the holes;
   (e) a source of electric potential;
   (f) conductors connecting one side of the source of potential to a selected one of the first plate means and the probe;
   (g) other conductors connecting the other side of the source to the first indicating means and the base; and
   (h) further conductors interconnecting the other side of the source of potential, the second plate, and the second indicating means.

7. The apparatus of claim 6 wherein the incremental differences in sizes of adjacent holes taken in order are substantially equal.

8. The apparatus of claim 6 wherein the first and second apertured plate means are arranged in planes parallel to one another, the holes in said first apertured plate means overlying and aligned with corresponding holes in said second apertured plate means.

9. The apparatus of claim 6 wherein indicia are associated with the holes, the indicia bearing a relationship to the size of the holes.

10. The apparatus of claim 6 wherein said probe is the selected one.

11. The device of claim 6 wherein the first plate means is the selected one.

12. The apparatus of claim 6 wherein said apertures are circular.

13. The device of claim 6 wherein one of the indicating means is an audible means and the other is a visual indicating means.

14. Apparatus for amusement of testing comprising:
   (a) a base member;
   (b) a spaced pair of apertured members connected to the base member and having aligned holes;
   (c) the holes of each apertured member being a variety of sizes and being axially alinged with a hole in the other apertured member of a corresponding relative size relationship;

(d) a probe means insertable through said holes;
(e) at least said probe means and one of the apertured members being electrically conductive;
(f) a signal means including a source of potential having one side connected to said one of the aperture members; and
(g) said signal means emitting a signal at times when the probe means contacts said one member and is connected to the other side of said source of electric potential.

15. The apparatus of claim 14 wherein the probe means is directly connected via a conductor to said other side of said source of electric potential.

16. The device of claim 14 wherein said other apertured member is connected to said other side of said source of electric potential and the probe means is connected to said other side of said source of electric potential when it is in contact with said other apertured member.

References Cited

FOREIGN PATENTS 297,054 1917 Germany.
318,627 1918 Germany.

ANTON O. OECHSLE, Primary Examiner
PAUL E. SHAPIRO, Assistant Examiner

U.S. Cl. X.R.

35—22; 128—2